(12) United States Patent
Okawa et al.

(10) Patent No.: US 8,822,618 B2
(45) Date of Patent: Sep. 2, 2014

(54) MICROCAPSULE AND METHODS OF MAKING AND USING MICROCAPSULES

(75) Inventors: David C. Okawa, San Bruno, CA (US); Stefan J. Pastine, San Francisco, CA (US); Alexander K. Zettl, Kensington, CA (US); Jean M. J. Frechet, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/393,183

(22) PCT Filed: Sep. 2, 2010

(86) PCT No.: PCT/US2010/047649
§ 371 (c)(1),
(2), (4) Date: Jun. 18, 2012

(87) PCT Pub. No.: WO2011/028884
PCT Pub. Date: Mar. 10, 2011

(65) Prior Publication Data
US 2012/0253000 A1    Oct. 4, 2012

Related U.S. Application Data

(60) Provisional application No. 61/239,414, filed on Sep. 2, 2009.

(51) Int. Cl.
C08F 32/06    (2006.01)
B29D 11/00    (2006.01)
C09K 3/00    (2006.01)
B01J 13/16    (2006.01)
C09B 67/02    (2006.01)

(52) U.S. Cl.
CPC ............ *B01J 13/16* (2013.01); *C09B 67/0097* (2013.01); *Y10S 977/762* (2013.01); *Y10S 977/773* (2013.01); *Y10S 977/774* (2013.01); *Y10S 977/742* (2013.01)

USPC ................ 526/340.3; 252/183.11; 264/1.1; 977/762; 977/773; 977/774; 977/742

(58) Field of Classification Search
CPC ............ C08F 32/06; B29D 11/00; C09K 3/00
See application file for complete search history.

(56) References Cited

U.S. PATENT DOCUMENTS 4,149,887 A * 4/1979 Levy ............................. 430/56
4,663,266 A * 5/1987 Adair et al. ................... 430/138

(Continued)

OTHER PUBLICATIONS

Yow et al., Formation of liquid core—polymer shell microcapsules, Soft Matter, vol. 2, pp. 940-949, (2006).

(Continued)

*Primary Examiner* — Randy Gulakowski
*Assistant Examiner* — Jeffrey Washville
(74) *Attorney, Agent, or Firm* — Lawrence Berkeley National Laboratory

(57) ABSTRACT

An embodiment of a microcapsule includes a shell surrounding a space, a liquid within the shell, and a light absorbing material within the liquid. An embodiment of a method of making microcapsules includes forming a mixture of a light absorbing material and an organic solution. An emulsion of the mixture and an aqueous solution is then formed. A polymerization agent is added to the emulsion, which causes microcapsules to be formed. Each microcapsule includes a shell surrounding a space, a liquid within the shell, and light absorbing material within the liquid. An embodiment of a method of using microcapsules includes providing phototriggerable microcapsules within a bulk material. Each of the phototriggerable microcapsules includes a shell surrounding a space, a chemically reactive material within the shell, and a light absorbing material within the shell. At least some of the phototriggerable microcapsules are exposed to light, which causes the chemically reactive material to release from the shell and to come into contact with bulk material.

17 Claims, 7 Drawing Sheets

(56) References Cited

U.S. PATENT DOCUMENTS

| | | | |
|---|---|---|---|
| 6,099,864 | A | 8/2000 | Morrison |
| 6,149,843 | A | 11/2000 | Scher |
| 7,829,119 | B2 * | 11/2010 | Rana et al. .................. 424/489 |
| 2002/0128348 | A1 | 9/2002 | Palmer |
| 2005/0158390 | A1 * | 7/2005 | Rana et al. .................. 424/489 |
| 2006/0115640 | A1 | 6/2006 | Yodh |
| 2007/0003631 | A1 | 1/2007 | Sayre |

OTHER PUBLICATIONS

White et al., Autonomic healing of polymer composites, Nature, vol. 409, pp. 794-797, (2001).

Santini et al., Microchips as Controlled Drug-Delivery Devices, Angew. Chem. Int. Ed., vol. 39, pp. 2396-2407, (2000).

De Geest et al., Microcapsules Ejecting Nanosized Species into the Environment, J. Am. Chem. Soc., vol. 130, pp. 14480-14482, (2008).

Mathiowitz et al., Polyamide Microcapsules for Controlled Release. V. Photochemical Release, Journal of Membrane Science, vol. 40, pp. 67-86, (1989).

Misawa et al., Laser Manipulation and Ablation of a Single Microcapsule in Water, J. Am. Chem. Soc., vol. 113, pp. 7859-7863, (1991).

Radt et al., Optically Addressable Nanostructured Capsules, Advanced Materials, vol. 16, pp. 2184-2189, (2004).

Skirtach et al., Reversibly Permeable Nanomembranes of Polymeric Microcapsules, J. Am. Chem. Soc., vol. 130, pp. 11572-11573, (2008).

Radziuk et al., Synthesis of Silver Nanoparticles for Remote Opening of Polyelectrolyte Microcapsules, Langmuir, vol. 23, pp. 4612-4617, (2007).

Yang et al., Experimental Observation of an Extremely Dark Material Made by a Low-Density Nanotube Array, Nano Letters, vol. 8, pp. 446-451, (2008).

Okawa et al., Surface Tension Mediated Conversion of Light to Work, J. Am. Chem. Soc., vol. 131, pp. 5396-5398, (2009).

Mathiowitz et al., Polyamide Microcapsules for Controlled Release. I. Characterization of the Membranes, Journal of Membrane Science, vol. 40, pp. 1-26, (1989).

Goodwin, Toluene Thermophysical Properties from 178 to 800 K at Pressures to 1000 Bar, J. Phys. Chem. Ref. Data, vol. 18, pp. 1565-1636, (1989).

Rodionov et al., Benzimidazole and Related Ligands for Cu-Catalyzed Azide-Alkyne Cycloaddition, J. Am. Chem. Soc., vol. 129, pp. 12696-12704, (2007).

Mathiowitz et al., Polyamide Microcapsules for Controlled Release. II. Release Characteristics of the Microcapsules, Journal of Membrane Science, vol. 40, pp. 27-41, (1989).

Mathiowitz et al., Polyamide Microcapsules for Controlled Release. III. Spontaneous Release of Azobenzene, Journal of Membrane Science, vol. 40, pp. 43-54, (1989).

Mathiowitz et al., Polyamide Microcapsules for Controlled Release. IV. Effects of Swelling, Journal of Membrane Science, vol. 40, pp. 55-65, (1989).

International Search Report and Written Opinion for International Application No. PCT/US 10/47649 mailed Oct. 21, 2010.

* cited by examiner

US 8,822,618 B2

MICROCAPSULE AND METHODS OF MAKING AND USING MICROCAPSULES

RELATED APPLICATIONS

This application is the national phase application of International application number PCT/US2010/047649, filed Sep. 2, 2010, which claims priority to and the benefit of U.S. Provisional Application No. 61/239,414, filed on Sep. 2, 2009, which is hereby incorporated by reference in its entirety.

STATEMENT OF GOVERNMENT SUPPORT

This invention was made with government support under Contract No. DE-AC02-05CH11231 awarded by the U.S. Department of Energy and with government support under Grant No. F32GM078780-03 awarded by the National institutes of Health. The government has certain rights in this invention.

BACKGROUND OF THE INVENTION

The present invention relates to the field of microcapsules (MCs) and, more particularly, to the field of microcapsules where light triggers a capsule response.

Release of selected chemical species at selected spatial positions at selected times is of central importance in biology, chemistry, and materials science. As an example, a time-release capsule of a certain medication, taken orally, accomplishes time/space release in a crude but effective way. Of great utility is a mechanism to reliably, stably, and carefully transport "packaged" chemicals via a liquid stream and release the chemicals from the package via "remote control" at a given location at a given time.

While liquid filled microcapsules (e.g., see ref 1) are widespread with applications as varied as carbonless copy paper, agrochemicals, or self-healing polymers (e.g., see ref. 2), remote triggering of content release is not common for free-flowing microcapsules. Langer et al. have described the remote release of chemicals from a microchip by dissolution of a polymer membrane triggered by application of an electric potential (see ref. 3). More commonly, release is induced through crushing or the application of other forms of mechanical stress (e.g., see refs. 1 and 2).

Triggering the release of the contents of MCs by light is attractive as light can easily address a small object or blanket an entire surface. In early work, Masuhara et. al, have reported the escape of toluene/pyrene droplets from an optically trapped melamine/formaldehyde microcapsule when irradiated with a second laser that caused ablation of the capsule wall (see ref. 5). Similarly, Au or Ag nanoparticles have more recently been used as optothermal triggers for the breakdown of semi-permeable polyelectrolyte membranes in which the Au or Ag nanoparticles are located in the semi-permeable membrane (see ref. 6).

Carbon nanotubes (CNTs) absorb light across the entire spectrum (e.g., see ref. 7) and efficiently convert the absorbed light into heat (e.g., see ref. 8). Unfortunately, CNTs are poorly soluble in most organic solvents.

The interfacial polymerization of triamines and diacid or triacid chlorides in an oil-in-water emulsion is a technique thoroughly studied by Mathowitz and Cohen (see ref. 9).

The synthesis, characterization, and properties of polyamide walled microcapsules are well documented, as in a series of papers (refs. 4a, 9, and 12a-c) by Mathowitz and Cohen.

SUMMARY OF THE INVENTION

Embodiments of the present invention include a microcapsule, a method of making microcapsules, and a method of using microcapsules.

An embodiment of a microcapsule of the present invention includes a shell surrounding a space, a liquid within the shell, and a light absorbing material within the liquid.

An embodiment of a method of making microcapsules of the present invention includes forming a mixture of a light absorbing material and an organic solution. An emulsion of the mixture and an aqueous solution is then formed. A polymerization agent is added to the emulsion, which causes microcapsules to be formed. Each microcapsule includes a shell surrounding a space, a liquid within the shell, and the light absorbing material within the liquid.

An embodiment of a method of using microcapsules of the present invention includes providing phototriggerable microcapsules within a bulk material. Each of the phototriggerable microcapsules includes a shell surrounding a space, a chemically reactive material within the shell, and light absorbing material within the shell. At least some of the phototriggerable microcapsules are exposed to light, which causes the chemically reactive material to release from the shell and to come into contact with the bulk material.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Embodiments of the present invention include a microcapsule, a method of making microcapsules, and a method of using microcapsules.

Figure 1:
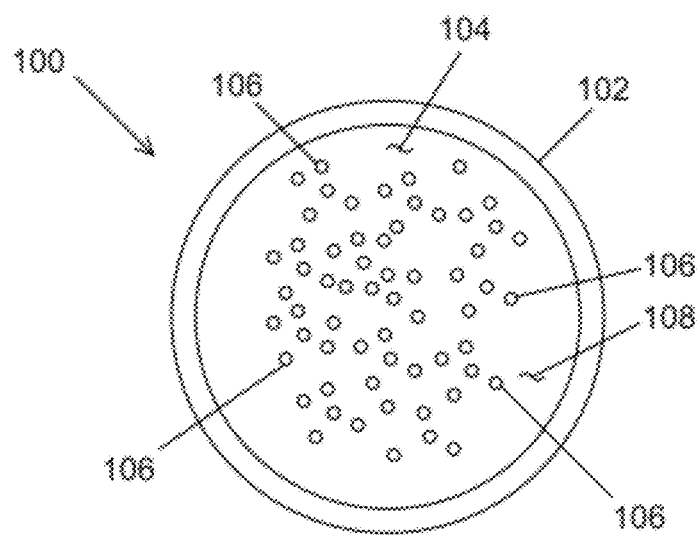
FIG. 1 illustrates an embodiment of a microcapsule of the present invention.

An embodiment of a microcapsule (MC) of the present invention is illustrated in FIG. 1. The microcapsule 100 includes a shell 102, a liquid 104, and light absorbing material 106. The shell 102 surrounds a space 108 where the liquid 104 resides. In an embodiment, the shell 102 is impermeable to a solvent. In an embodiment, the shell 102 comprises a polyamide material. In an embodiment, the liquid 104 comprises a chemically reactive material. In an embodiment, the chemically reactive material is selected from the group consisting of a chemically reactive liquid, a chemically reactive solution, a chemically reactive colloid, or some other suitable chemically reactive material.

In an embodiment, the microcapsule further comprises a chemically reactive gas within the shell. In an embodiment, the light absorbing material comprises a particular light absorbing material selected from the group consisting of a nanostructure, a dye, a pigment, and carbon black. In an embodiment, the light absorbing material comprises nanostructures, which may be selected from the group consisting of nanotubes, nanoprisms, nanoparticles, branched nanoparticles, nanodisks, nanorods, nanospindles, nanowires, quantum dots, other suitable nanostructures, and a combination thereof. As used herein, the term "nanostructure" means a structure having a dimension on a nanometer scale (i.e. 1 to 1,000 nm).

In a particular embodiment, the nanostructures comprise carbon nanotubes CNTs). The nanostructures may comprise a metallic or semiconducting material. The nanostructures are predominantly located in the liquid 104 but may also be found in the shell 102. In an embodiment, the nanostructures comprise phototriggerable particles. In an embodiment, the shell 102 has an outside diameter on a micrometer scale (i.e. within 1 to 1,000 μm). In another embodiment, the shell 102 has an outside diameter on a nanometer scale. The microcapsule 100 provides the ability to encapsulate a reactive material and produces a free-flowing solid that can be mixed easily with another material allowing the reactive material to be released into the other material on demand.

Figure 2:
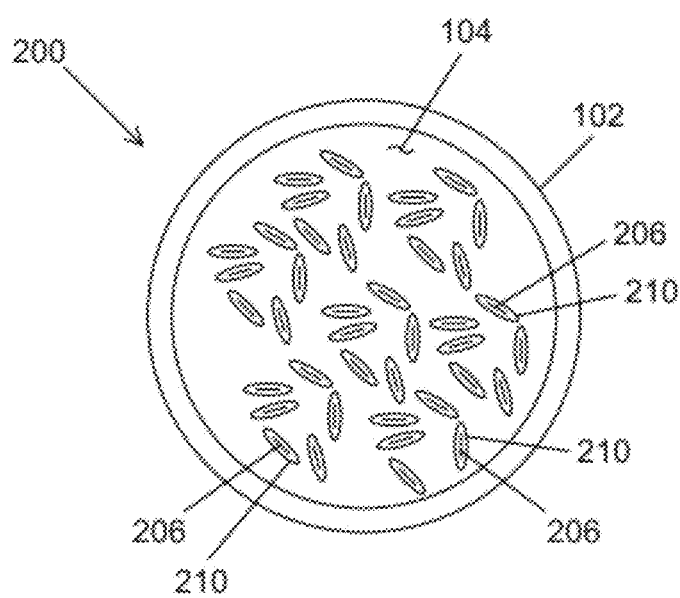
FIG. 2 illustrates another embodiment of a microcapsule of the present invention.

Another embodiment of a microcapsule of the present invention is illustrated in FIG. 2. The microcapsule 200 includes the shell 102, the liquid 104, and carbon nanotubes 206 (i.e. nanoparticles) or other suitable light absorbing materials. In an embodiment, the carbon nanotubes 206 are surrounded by a microencapsulation material 210. In an embodiment, the microencapsulation material 210 comprises the polyamide material.

An embodiment of a method of making microcapsules of the present invention includes forming a mixture of a light absorbing material and an organic solution. An emulsion of the mixture and an aqueous solution is then formed. A polymerization agent is added to the emulsion, which causes microcapsules to be formed. Each microcapsule includes a shell surrounding a space, a liquid within the shell, and the light absorbing material within the liquid.

An embodiment of a method of using microcapsules of the present invention includes providing phototriggerable microcapsules within a bulk material. Each of the phototriggerable microcapsules includes a shell surrounding a space, a chemically reactive material within the shell, and light absorbing material within the shell. At least some of the light absorbing material is exposed to light, which causes the chemically reactive material to release from the shell and to come into contact with the bulk material. In an embodiment, the phototriggerable microcapsules and bulk material comprise an epoxy in which the phototriggerable microcapsules hold a curing agent (i.e. the chemically reactive material) and the bulk material is a resin. In an embodiment, the light absorbing material includes a particular light absorbing material selected from the group consisting of a nanostructure, a dye, a pigment, and carbon black. In an embodiment, the chemically reactive material is selected from the group consisting of a chemically reactive liquid, a chemically reactive solution, a chemically reactive colloid, and a chemically reactive gas. In an embodiment, the bulk material is selected from the group consisting of a liquid and a solid.

The microcapsule 100 and the method of using the microcapsule of the present invention allow chemicals to be stably packaged into a compact, chemically versatile form, to be released by remote control by suitable electromagnetic (EM) radiation. The radiation can be optical (e.g. via laser) or via non-visible EM waves (which can, for example, penetrate body tissue. The microcapsule 100 can be further functionalized to make them compatible with a host liquid-transporting system. The method can also be used to set up and trigger a rapid conversion of chemical to pressure or thermal energy (i.e. an explosion).

The present invention provides remotely triggerable liquid-filled free-flowing solid MCs with impermeable shell walls that enable the coexistence of otherwise incompatible chemical species in a single container until their reaction is desired. The present invention provides remotely triggered MCs in which the encapsulated liquid contains optothermally active species (as depicted in FIG. 2), such as CNTs, which can rapidly heat up the liquid content when irradiated. Irradiation of an MC would then trigger a rupture mechanism involving an increase in internal pressure of the MC.

First Set of Experimental Results

An experiment involving the present invention used a microencapsulation method that not only prevents the partitioning of the CNTs into the continuous phase, but also permits the isolation of free-flowing solids. Namely, the microencapsulation method used was the interfacial polymerization of triamines and diacid or triacid chlorides in an oil-in-water emulsion (see ref 9).

Figure 3:
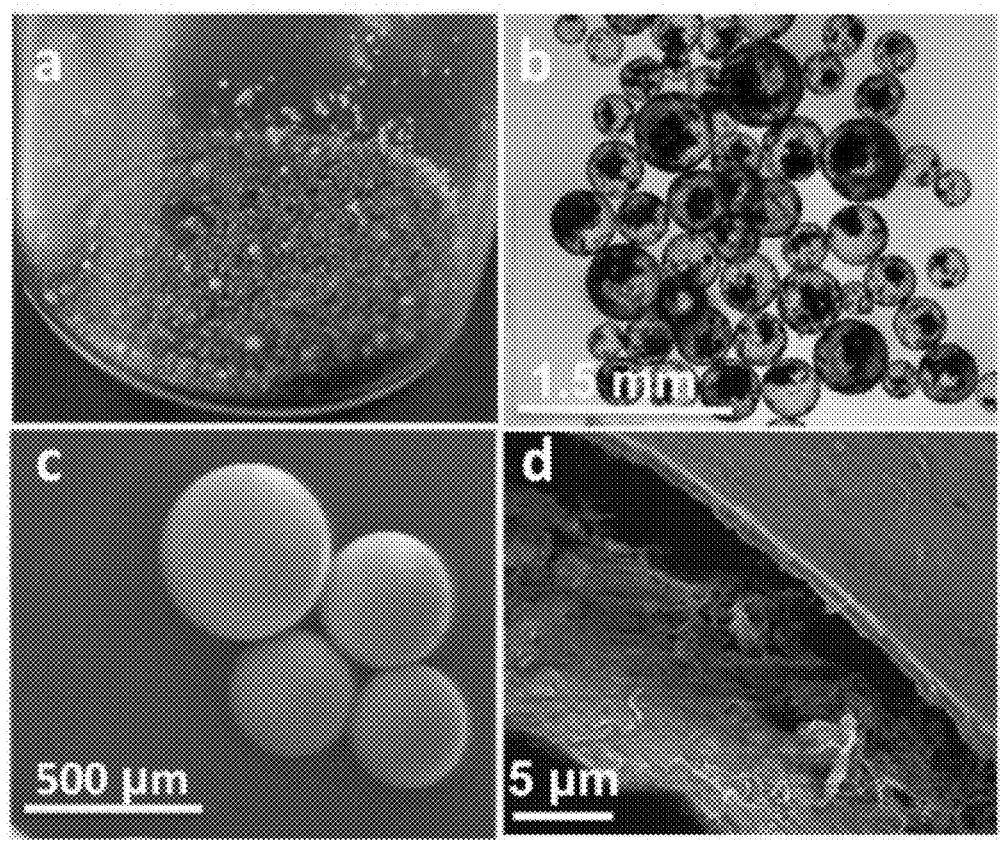
FIG. 3. Toluene filled polyamide microcapsules containing 1 wt % CNTs. (a) Optical image of MCs in a scintillation vial. (b) Optical image of MCs in oil. (c) Scanning electron micrograph of MCs. (d) Scanning electron micrograph (SEM) of crushed MCs.

In a typical procedure, CNTs (1 mg) were sonicated in a solution of organic liquid (1 g) and terphthaloyl chloride (45 mg). The suspension was emulsified in 3 mL of a 0.4% aqueous solution of polyvinyl alcohol (87-89% hydrolyzed), and then an aqueous solution diethylenetriamine (650 μL in 1 mL water) was added dropwise to the emulsion. Membrane formation around the oil droplets was nearly instantaneous but the particles were allowed to set for an additional 1.5-24 hours to ensure that solid-walled and impermeable MCs were obtained. Isolation by filtration afforded free-flowing, liquid-filled MCs (FIGS. 3a and 3b) in yields ranging from 80-95%. MCs with diameters in the range of 100-1000 μm were easily accessible with the average diameter being controlled by emulsion stir rate, as further described in the below-included Second Set of Experimental Results. Shell thickness was determined to be approximately 1 μm by SEM (FIG. 3d), and the liquid fill content for toluene-filled capsules was determined to be approximately 95 wt % via physical crushing and removal of the volatiles in vacuo. Optical images (FIG. 3b) revealed that the majority of the CNTs were located inside the MCs. As shown in FIG. 3d, further SEM analysis of crushed particles showed that some of the CNTs (white bundles in FIG. 3d) are embedded in and on the shell material.

Physical crushing of the MCs produced an audible pop and resulted in ejection of the encapsulated liquid, demonstrating the good barrier properties of the shell-wall. Notably, no significant decrease in fill content of the MCs was apparent after standing in air for over 2 months, as further described in the below-included Second Set of Experimental Results. Furthermore, leakage studies with encapsulated phenylacetylene revealed that little to none of the liquid content escaped when the MCs were immersed in solvents that do not swell the cross-linked polyamide shell wall such as t-butanol, benzene, and hexanes as well as water, as further described in the below-included Second Set of Experimental Results.

Figure 4:
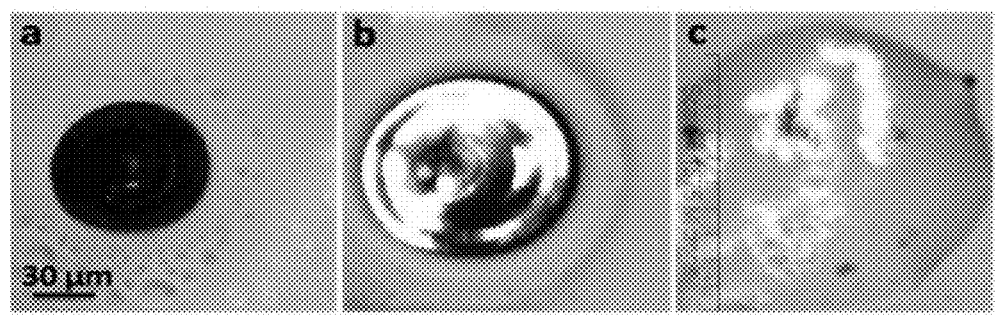
FIG. 4. Optical micrographs of a nanotube filled microcapsule prior to irradiation (a), during irradiation (b), and after bursting (c).

With the experiment having confirmed negligible leakage of the liquid contents under a broad range of conditions, another test was conducted to determine if liquid release could be optically triggered with a near-infrared (IR) laser. Indeed, as depicted in FIGS. 4a, 4b, and 4c, it was determined that encapsulated toluene could be optothermally released via laser irradiation (785 nm, 400 mW diode laser) in air. Bursting of the MCs occurred within 0.02 s, and observation of the process under an optical microscope revealed that swelling can occur immediately prior to bursting (FIGS. 4a, 4b, and 4c). As shown in FIG. 3b, swelling was evident during irradiation, resulting in an increase in internal volume on the order of 2.5 times. For comparison, heating of toluene filled MCs in a standard melting point capillary resulted in considerable swelling and bursting at approximately 171° C., which correlates to an internal pressure of approximately 4.5 atm (e.g., see ref. 10). Importantly, the MCs can also be optothermally ruptured by IR laser irradiation when immersed in liquids such as water or alcohols, and a release efficiency of greater than 95% was obtained for phenylacetylene MCs as determined by ultraviolet-visible (UV-Vis) spectroscopy. Control particles lacking CNTs did not rupture under analogous irradiation in liquids or in air.

Figure 5:
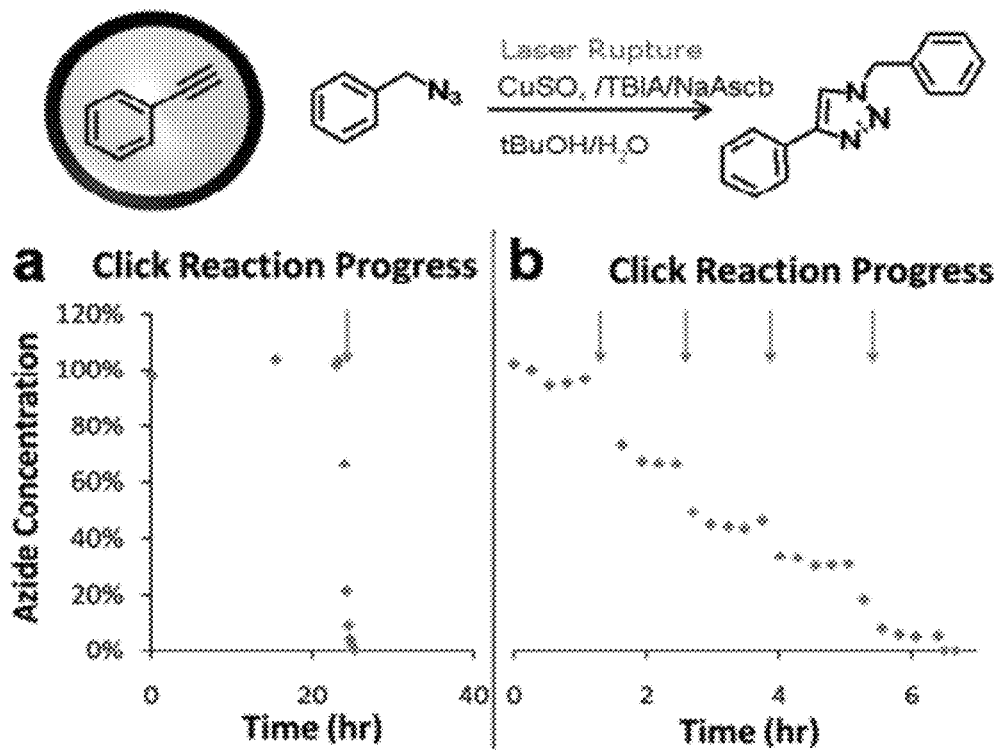
FIG. 5. Click reaction progress as monitored by gas chromatography-mass spectrometry (GC-MS) via the consumption of benzyl azide.

To demonstrate the concept that mutually reactive materials can be stored in intimate proximity and remotely released "on demand," phenylacetylene/CNT MCs were immersed in a solution containing benzyl azide under highly reactive click conditions (e.g., see ref. 11). The click reaction is a useful test system because when contacted in the presence of Cu (I), phenylacetylene and benzyl azide react rapidly to give the corresponding triazole, near quantitatively. FIG. 5a demonstrates the coexistence of the phenylacetylene/CNT MCs with the solution of azide and copper catalyst until laser rupture after 24 hours (indicated with arrow in FIG. 5a). Laser-induced bursting of the MCs resulted in rapid consumption of benzyl azide with complete conversion within 1 hour. FIG. 5a depicts the laser rupture of multiple MCs at a single time point to completely consume all of the azide. The spatial resolution of the laser also enabled the successive triggering of several MCs, resulting in the controlled and stepwise consumption of the starting material (FIG. 5b). FIG. 5b depicts the selective rupture of individual MCs among a group, showing the ability to trigger the reaction in a stepwise fashion. The difference in the size of the steps in FIG. 5b reflected the difference in the size of the MCs.

Figure 6:
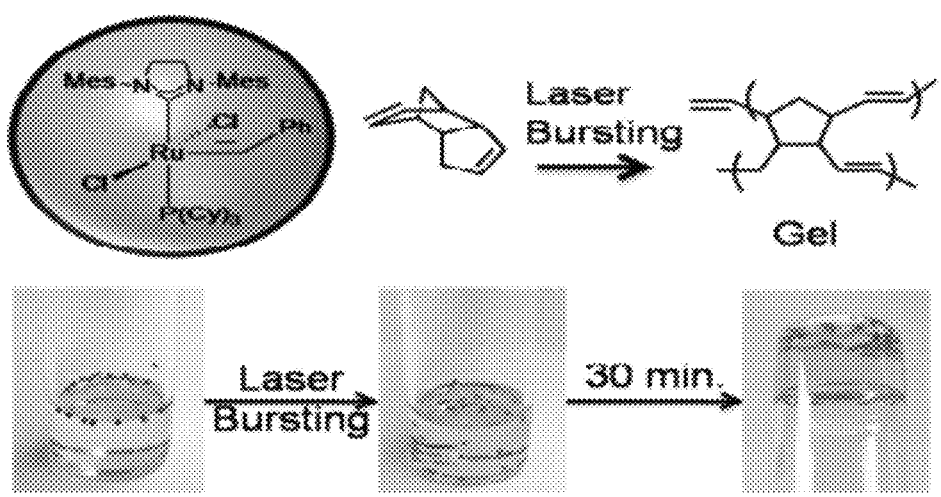
FIG. 6. Ring opening metathesis of dicyclopentadiene (DCPD) using encapsulated Grubbs Catalyst.

As another demonstration of remote initiation, the "on-demand" laser induced polymerization of dicyclopentadiene (DCPD) via ring opening metathesis polymerization was explored. To this end, Grubb's second generation catalyst was encapsulated as a 5 wt. % solution in toluene. These MCs can be dispersed in neat DCPD (1 mg MC/100 mg DCPD) for weeks without a noticeable increase in viscosity. In contrast, laser bursting of the capsules resulted in the polymerization of DCPD, leading to gelling within minutes and subsequent hardening over tens of minutes (FIG. 6). FIG. 6 depicts images of MCs in DCPD (left), after bursting (center), and finally after gelling (right). This example further highlighted the large "on-off" characteristics that can be obtained with these responsive MCs. The fact that the encapsulated small molecule catalyst maintained significant activity is notable, considering that free amines were used for encapsulation and that localized optothermal heating was used for release.

In conclusion, the concept of light-triggerable, liquid-filled microcapsules via co-encapsulation of CNTs using an interfacial polymerization technique was demonstrated. It was observed that the solid polyamide shell provides substantial protection from the external environment to its encapsulated liquid contents but remains breachable upon irradiation. The concept of storage and remote release with mutually reactive small molecules and catalysts was demonstrated.

Second Set of Experimental Results

Purified multiwall CNTs were obtained from SES Research. Benzyl azide was prepared via reaction of benzyl bromide with excess $NaN_3$ in dimethylformamide (DMF). All other chemicals were obtained from Sigma-Aldrich Corporation and used as received. A near-IR diode laser (450 mW B&W Tek, Inc. model no. 785-450E/55371) was used for remote rupturing of MCs; the maximum power was found to be 400 mW. GC-MS was performed on an Agilent Technologies 7890A gas chromatograph equipped with a 30 m HPS-MS capillary column and 5975 Mass Selective Detector. UV-Vis was performed on a Shimadzu Corporation UV-360 spectrophotometer. Scanning Electron Micrographs were obtained on a FEI Company Sirion XL30.

Preparation of Phototriggerable Microcapsules

Microcapsule Preparation

Figure 7:
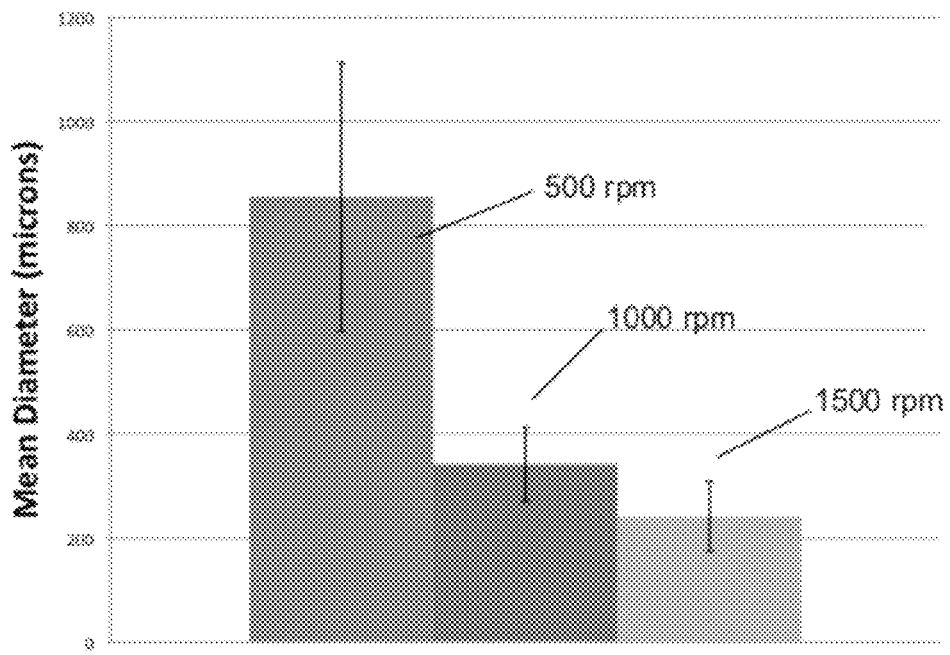
FIG. 7. The mean diameter and standard deviation (error bars) for TR-toluene/CNT MCs as a function of stir rate.
Figure 9:
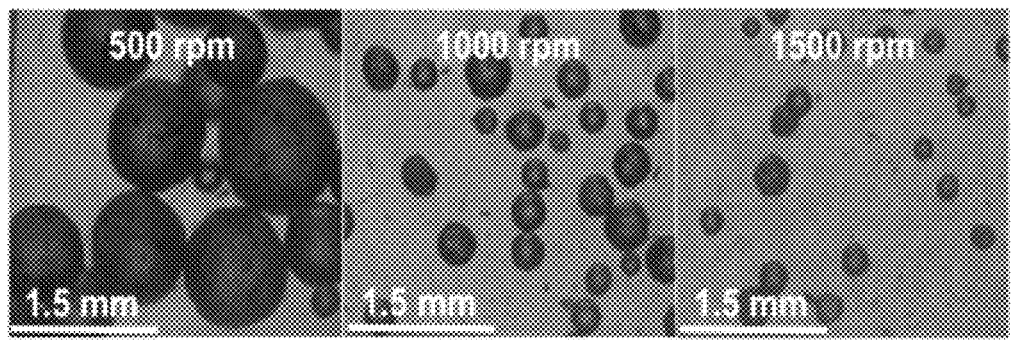
FIG. 9. Optical comparison of TR-Toluene/CNT MCs prepared at three different stirring rates.

The average MC size was found to decrease with increased emulsification stir rate (see FIGS. 7 and 9). If a narrow distribution of a particular MC diameter were desired, then the particles could be sieved through standard meshes. The average MC size appears to be fixed upon the addition of diethylenetriamine. FIG. 7 shows the results of stirring the emulsion for 30 s before the addition of diethylenetriamine. The images in FIG. 9 were taken on thin films of polydimethylsiloxane (PDMS).

To obtain free-flowing particles, the MCs were allowed to "set" for a minimum of 90 minutes after the addition of the cross-linking amine. A longer setting period was found not to be detrimental, but rather, ensured the likelihood that free-flowing particles would be obtained.

General Microencapsulation Procedure

To a 20 mL glass vial equipped with a ½"×⅛" magnetic stir bar was added 3 mL of a 0.4 wt. % polyvinyl alcohol (PVA) (87-89% hydrolyzed) solution in water. To a separate 8 mL glass vial was added multiwall CNTs (1 mg), terephthaloyl chloride (45 mg, 0.22 mmol) or trimesoyl chloride (55 mg, 0.21 mmol) and 1 g of solvent (toluene, phenylacetylene, or chloroform). The mixture was sonicated (approximately 5 minutes) and then added to the polyvinyl alcohol solution with magnetic stirring. Stirring (500-1500 rpm; IKA Werke GmbH & Co. KG stir plate setting) was continued for an additional 0.5-1 min, and then diethylenetriamine (DETA) (650 µL, 5.98 mmol, approximately 27 equiv.) in 1 mL distilled water was added dropwise over approximately 0.5-1 minute. After the addition of DETA, the stirring was stopped, and the MCs were allowed to set for 1.5-24 hours (at times, small amounts wispy white polymer material formed, which was physically removed). The suspension was then added to 100 mL of deionized (DI) water and filtered through 0.45 µm nylon filter membrane. The MCs were then washed with an additional 100 mL of DI water, 100 mL acetone, and 20 mL of diethyl ether. The resulting microcapsules appear grey to black and behave as non-agglomerated, free flowing solids.

Preparation of MCs with Grubb's Catalyst

A solution of 2nd generation Grubb's Catalyst (5 wt. %9 in toluene) was encapsulated by the above-mentioned General Microencapsulation Procedure using terphthaloyl chloride with the following modifications: (1) the PVA, DETA, and organic solutions were evacuated and refilled with $N_2$ (without freezing) and MC formation was carried out under a nitrogen atmosphere, and (2) the MCs were isolated after a 2 hour set period. Significantly longer set periods could result in particles that are inactive for polymerization, while significantly shorter set periods could produce particles without the ideal free-flowing characteristics. If the MCs were not free-flowing (e.g. agglomerated bundles of MCs), there could be an increased background rate of DCPD curing (See Polymerization of Dicyclopentadiene below.) presumably due to leakage of the catalyst.

Optical Images of MCs

Figure 8:
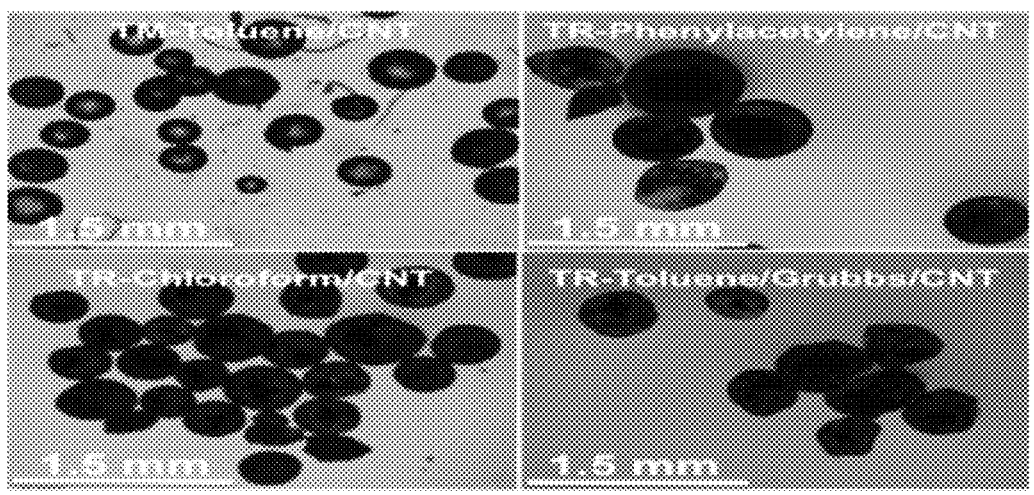
FIG. 8. Optical images of different MCs prepared under the general conditions.

FIG. 8 provides optical images of four examples of MCs produced by the above-mentioned General Microencapsulation Procedure and Preparation of MCs with Grubb's Catalyst procedure. The images in FIG. 8 were taken in oil or on a thin film of PDMS (top left).

Fill Content Analysis

The wt. % of encapsulated liquid was determined by placing a known amount of TR-toluene/CNT MCs in a tarred vial, physically crushing the microcapsules, and removing the volatile liquid fraction under reduced pressure (See Table 1.).

TABLE 1

Comparison of Liquid Fill Content of TR-toluene/CNT MCs Over Time

|  | 1 Day After Isolation | 30 Days After Isolation | 64 Days After Isolation |
| --- | --- | --- | --- |
| Tarred Weight | 115.3 mg, 161.9 mg | 93.1 mg | 110 mg |
| Weight after removal of volatiles | 5.3 mg, 6.5 mg | 3.9 mg | 4 mg |
| Liquid Fill Content | 95%, 96% | 96% | 96% |

Leakage Studies

Figure 10:
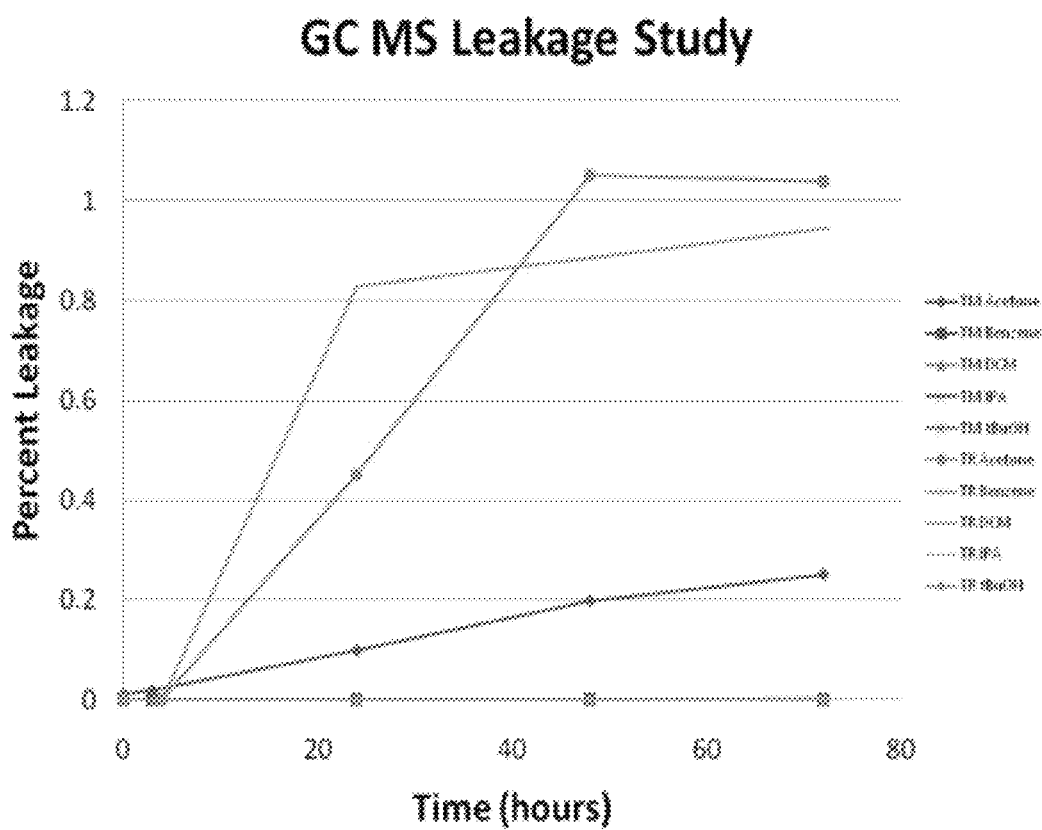
FIG. 10. Leakage study of phenylacetylene filled particles monitored by GC-MS.

Phenylacetylene/CNT MCs made using either terephthaloyl chloride (TR) or trimesoyl chloride (TM) were placed in GC-MS vials containing dodecane (1 μL) as arm internal standard and solvent (acetone, benzene, hexanes, t-BuOH-, isopropyl alcohol, or dichloromethane). The appearance of phenylacetylene was monitored periodically via GC-MS. For MCs made with TR, no phenylacetylene was detected for isopropyl alcohol, benzene, hexanes, t-BuOH over the monitored period (72 hours); significant leakage occurred in acetone and DCM (FIG. 10). Increased cross-linking, as a result of incorporation of TM instead of TR reduced or eliminated leakage. FIG. 10 depicts increasing cross-linking density by incorporating TM decreased permeability. FIG. 10 also shows that substantial leakage was observed for TR-MCs in acetone and dichloromethane (DCM). TM-MCs only showed leakage in acetone. Solvents such as DMF, tetrahydrofuran (THF), and methanol result in considerable leakage almost immediately after immersion.

Remote Laser Release

Remote triggering was achieved by focusing a 400 mW laser below one square millimeter on the MCs. At this power density, MCs bursted essentially instantaneously. Release was typically associated with physical bursting, or significant swelling of the microcapsule. In solution, laser induced heating of MCs could generate convective flows and MC movement. This motion could make laser bursting more difficult in liquids. All microcapsules prepared bursted analogously.

Laser Induced Release Efficiency

Figure 11:
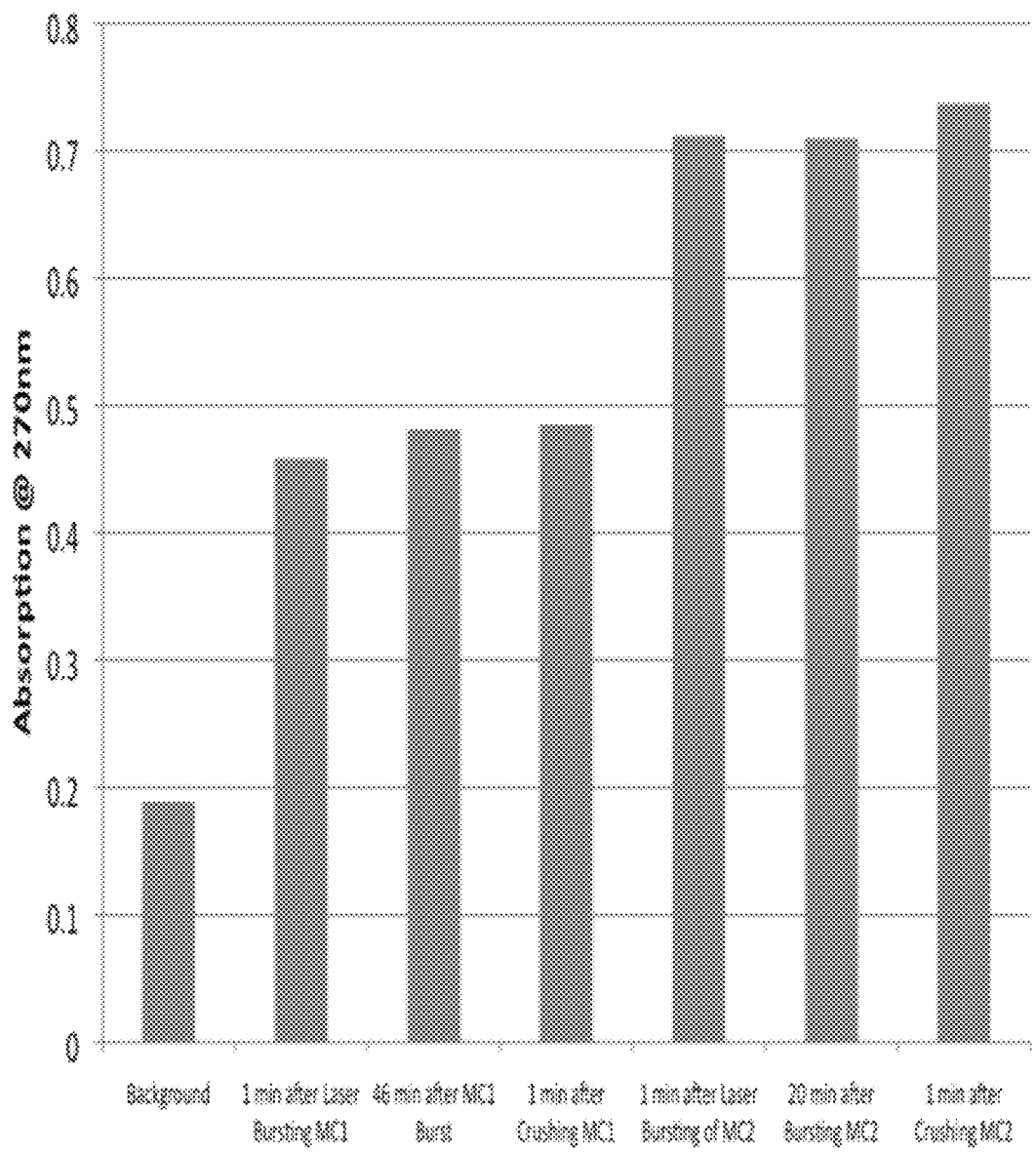
FIG. 11. Laser induced release of phenylacetylene from TR-MCs in tBuOH.
Figure 12:
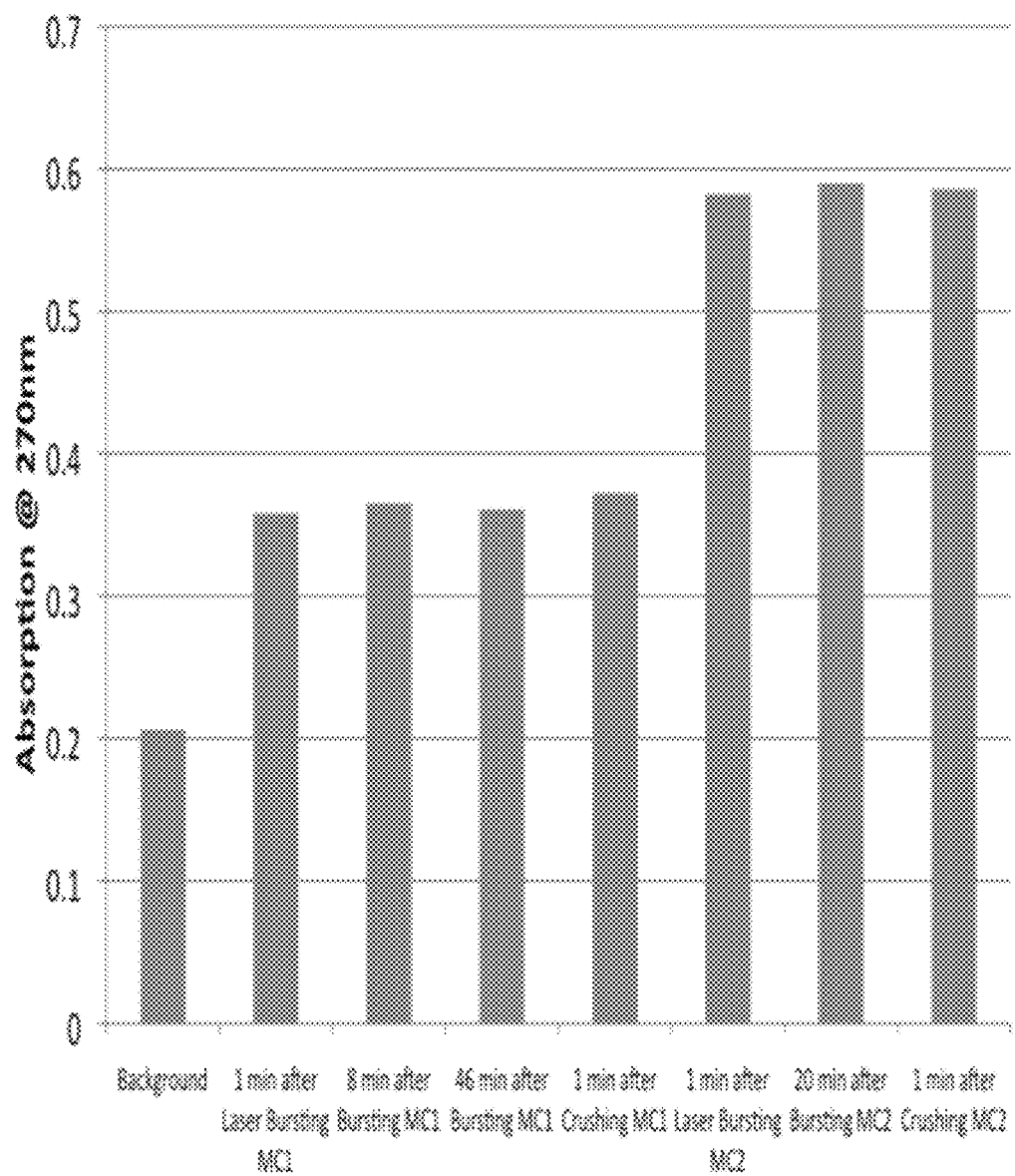
FIG. 12. Laser induced release of phenylacetylene from TM-MCs in tBuOH.

Two Phenylacetylene/CNT MCs were immersed in t-BuOH in a quartz cuvette. To determine release efficiency, a single MC was burst with a laser and the absorbance at 270 nm was monitored by UV-Vis spectroscopy. After one hour, the burst particle was physically crushed and any further release was monitored by UV-Vis. The process was repeated with the second MC. This was performed for both TR- and TM based phenylacetylene/CNT MCs and the release efficiency was stated as the percent released from laser bursting compared to that from complete crushing (FIGS. 11 and 12).

Protection and Laser Release of Chemicals into a Reactive Environment Click Reaction TBIA was used as a ligand to accelerate the click reaction (see ref. 11). The following stock solutions were prepared in t-BuOH: 25 mM benzyl azide, 12.5 mM TBIA. The following stock solutions were prepared in DI water: 25 mM $CuSO_4$, 50 mM sodium ascorbate.

To a GC-MS vial was added 400 μL of benzyl azide stock, 150 μL $CuSO_4$ stock, 280 μL of TBIA stock, 400 μL of sodium ascorbate stock, 200 μL of t-BuOH, and 2 μL of dodecane (internal standard). To the solution was added 5 phenylacetylene MCs (approximately 2 mg). The disappearance of benzyl azide was monitored via GC-MS. Remote rupturing was achieved by focusing the laser on the immersed MCs. The spot size of the focused beam was less than 1 $mm^2$. After rupture of a single (or multiple) MC, the vial was placed back in the GC-MS and continuously monitored (approximately 15 minute delay between injections). This process was repeated until benzyl azide was consumed. In the first time points after laser rupture, a small amount of phenylacetylene was typically observed in the GC-MS; the phenylacetylene peak disappeared in subsequent time points. The [3+2] cycloaddition product was the only product peak detected; however, the yield was not quantified due to a combination of poor solubility and inconsistent behavior on the GC-MS.

Polymerization of Dicyclopentadiene

Grubbs catalyst containing MCs (approximately 1 mg) were dispersed in neat DCPD (100 mg). The MCs were ruptured with a laser or by physical crushing. After rupturing, a gel was produced in approximately 10-30 minutes, with formation of a rubbery state, and then a solid resin over time. No gelling of DCPD was evident over two weeks with uncrushed MCs; however, the latent catalyst remained active as subsequent rupture of the MCs that had been left for five days still produced a gel in approximately 45-60 minutes. A background gelling rate of approximately 1 day was obtained with prepared particles that were not free flowing.

REFERENCES

1. Yow, H. N.; Routh, A. F. *Soft Matter* 2006, 940-949.
2. White, S. R.; Sottos, N. R.; Geubelle, P. H.; Moore, J. S.; Kessler, M. R.; Sriram, S. R.; Brown, E. N.; Viswanathan, S. *Nature* 2001, 409, 794-797.
3. Santini, J. T.; Richards, A. C.; Scheidt, R.; Cima, M. J.; Langer, R. *Angew Chem. Int. Ed,* 2000, 39, 2396-2407.
4. (a) De Geest, B. G.; McShane, M. J.; Demeester, J.; De Smedt, S. C.; Hennink, W. E. *J. Am. Chem. Soc.* 2008, 130, 14480-14482. (b) Mathiowitz, E.; Cohen, M. D. *J. Membrane Sci.* 1989, 40, 67-86.
5. Misawa, H.; Kitamura, N.; Masuhara, H. *J. Am. Chem. Soc.* 1991, 113, 7859-7863.
6. For selected Au examples see: (a) Radt, B.; Smith, T, A.; Caruso, F. *Adv. Mater.* 2004, 16, 2184-2189. (b) Skirtach, A. C.; Karageorgiev, P.; Bédard, M. F.; Suiorukov, G. B.; Möhwald, H. *J. Am. Chem. Soc.* 2008, 130, 11572-11573. For selected Ag examples see: (c) Radziuk, D.; Shchukin, D. G.; Skirtach, A. G.; Möhwald, H.; Sukhorukov, G. B. *Lagmuir* 2007, 23, 4612-4617.

7. Yang, Z. P.; Ci, L.; Bur, J. A.; Lin, S. Y.; Ajayan, P. M. *Nano Lett.* 2008, 8, 446-451.
8. Okawa, D.; Pastine, S. J.; Zettl, A.; Fréchet, J. M. J. *J. Am. Chem. Soc.* 2009, 131, 5396-5398.
9. Mathiowitz, E.; Cohen, M. D. *J. Membrane Sci.* 1989, 40, 1-26.
10. Goodwin, R. D. *J. Phys. Chem. Ref Data* 1989, 18, 1565-1636.
11. Rodionov, V. O.; Presolski, S. I.; Gardiner, S.; L, Y-. H.; Finn, M. G. *J. Am. Chem. Soc* 2007, 129, 12696-12704.
12. (a) Mathiowitz, E.; Cohen, M. D. *J. Membrane Sci.* 1989, 40, 27-41. (b) Mathiowitz, E.; Cohen, M. D. *J. Membrane Sci.* 1989, 40, 43-54. (c) Mathiowitz, E.; Cohen, M. D. *J. Membrane Sci.* 1989, 40, 55-65.

CONCLUSION

As used herein and in the appended claims, the singular forms "a", "and", and "the" include plural referents unless the context clearly dictates otherwise.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A microcapsule comprising:
   a shell surrounding an open volume;
   a liquid in the open volume; and
   nanostructures in the liquid, the nanostructures comprising carbon nanotubes, the nanostructures configured to absorb light, a temperature of the nanostructures increasing when the nanostructures absorb the light, the temperature increase of the nanostructures operable to cause the shell to release the liquid from the open volume.

2. The microcapsule of claim 1 wherein the shell is impermeable to a solvent.

3. The microcapsule of claim 1 wherein the shell comprises a polyamide material.

4. The microcapsule of claim 1 wherein the liquid comprises a chemically reactive liquid.

5. The microcapsule of claim 1 wherein the liquid comprises a chemically reactive colloid.

6. The microcapsule of claim 1 further comprising:
   a chemically reactive gas in the open volume.

7. The microcapsule of claim 1 wherein the carbon nanotubes are surrounded by a microencapsulation material.

8. The microcapsule of claim 7 wherein the microencapsulation material comprises a polyamide material.

9. The microcapsule of claim 1 wherein the shell has a maximum dimension on a micrometer scale.

10. The microcapsule of claim 1 wherein the shell has a maximum dimension on a nanometer scale.

11. The microcapsule of claim 1 wherein the light is light generated with a near-infrared laser.

12. The microcapsule of claim 1 wherein the temperature increase of the nanostructures is configured to cause the open volume to increase, and wherein the open volume increase is configured to cause the shell to rupture.

13. The microcapsule of claim 1 wherein the liquid comprises an epoxy curing agent and wherein the microcapsule is configured to be positioned in an epoxy resin.

14. A method of making microcapsules comprising:
   forming a mixture of nanostructures and an organic solution, the nanostructures comprising carbon nanotubes;
   forming an emulsion of the mixture and an aqueous solution; and
   adding a polymerization agent to the emulsion to form the microcapsules, each microcapsule comprising:
      a shell surrounding an open volume; and
      a liquid in the open volume, the liquid including the nanostructures, the nanostructures configured to absorb light, a temperature of the nanostructures increasing when the nanostructures absorb the light, the temperature increase of the nanostructures operable to cause the shell to release the emulsion from the open volume.

15. A method of using microcapsules comprising:
   providing the microcapsules within a bulk material, each of the microcapsules comprising:
      a shell surrounding an open volume;
      a liquid in the open volume; and
      nanostructures in the liquid, the nanostructures comprising carbon nanotubes, the nanostructures configured to absorb light, a temperature of the nanostructures increasing when the nanostructures absorb the light, the temperature increase of the nanostructures operable to cause the shell to release the liquid from the open volume; and
   exposing at least some of the microcapsules to the light, causing the liquid to be released from the shell and to come into contact with the bulk material.

16. The method of claim 15 wherein the liquid is selected from a group consisting of a chemically reactive liquid and a chemically reactive colloid.

17. The method of claim 15 wherein the bulk material is selected from a group consisting of a liquid and a solid.

* * * * *